R. M. CAROTHERS.
REGULATING SYSTEM.
APPLICATION FILED MAY 27, 1919.
1,331,898.
Patented Feb. 24, 1920.
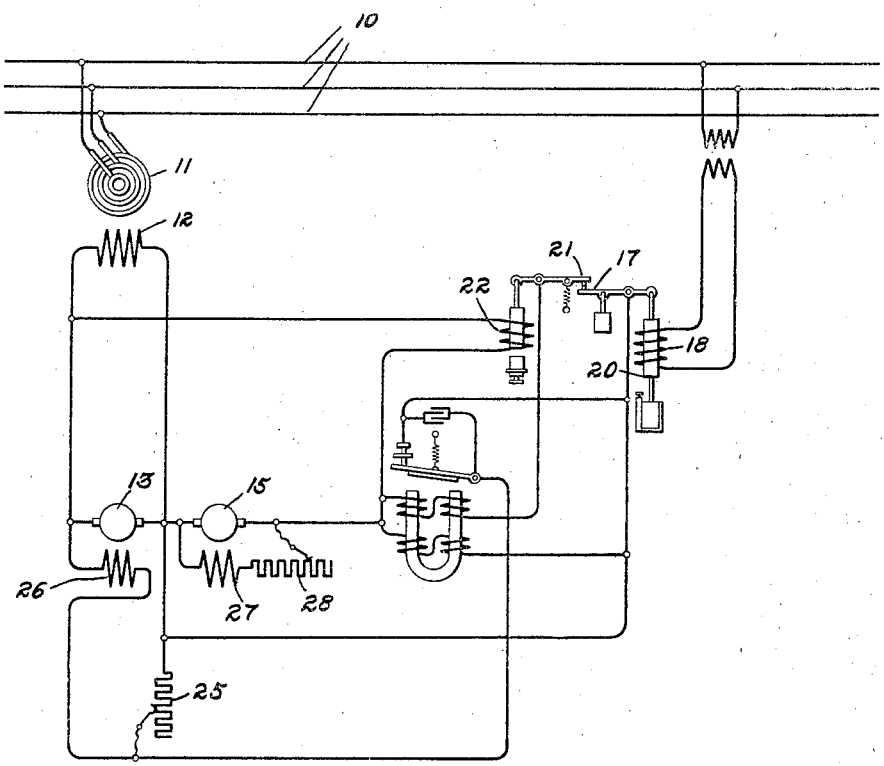
Inventor:
Robert M. Carothers,
by
His Attorney

UNITED STATES PATENT OFFICE.

ROBERT M. CAROTHERS, OF SCHENECTADY, NEW YORK, ASSIGNOR TO GENERAL ELECTRIC COMPANY, A CORPORATION OF NEW YORK.

REGULATING SYSTEM.

1,331,898.  Specification of Letters Patent.  Patented Feb. 24, 1920.

Application filed May 27, 1919. Serial No. 300,124.

*To all whom it may concern:*

Be it known that I, ROBERT M. CAROTHERS, a citizen of the United States, residing at Schenectady, county of Schenectady, State of New York, have invented certain new and useful Improvements in Regulating Systems, of which the following is a specification.

My invention relates to means for regulating the electrical condition, that is, voltage, current, or power factor of a system of electrical distribution, and more particularly to means of that character which includes a vibrating contact regulator, such as that disclosed in Tirrill Patent No. 726,234.

The object of my invention is to increase the range of regulation which may be secured by such means.

Regulators of the vibrating contact type, such as that disclosed in the above-mentioned Tirrill patent, have one of the electromagnetic coils which actuate the contacts connected across the exciter leads. When a single exciter is used, the range of regulation is considerably limited because of the fact that it is not feasible to reduce the excitation of the exciter field so that it approaches zero. This is because such a procedure would cause the vibration of the regulator contact controlled by the electromagnetic coil connected across the exciter leads to cease, and it has been found in practice that good regulation cannot be secured if this vibration stops.

According to my invention, I connect a dynamo-electric machine to the field winding of the main dynamo-electric machine to supply excitation thereto, and also connect one of the electromagnetic coils controlling the vibrating contact of the regulator across the armature leads of said exciting dynamo-electric machine, the regulator being arranged to control the excitation of the exciting dynamo-electric machine. In series with the electromagnetic coil, I insert a source of electrical energy and preferably I make this a source having a constant potential. The result secured by this system is that the voltage delivered to the exciting winding of the main dynamo-electric machine is that of the exciting dynamo electric machine, and the voltage applied to the electromagnetic coil is the sum of the voltages of the exciting dynamo-electric machine and the source of electrical energy.

One application of my invention is to systems wherein a synchronous condenser is used to keep the voltage at a point in the line constant. This is done by varying the field excitation of the synchronous condenser according to the voltage of the line by means of a regulator of the vibrating contact type, such as that disclosed in the above-mentioned Tirrill patent. On long transmission lines, it frequently occurs that the voltage is higher at the receiving end than at the distributing end, and in order to take care of such a condition the excitation of the synchronous condenser may be practically zero. By the use of my invention this may be accomplished without causing the regulator contacts to cease vibrating.

My invention will be more clearly understood by reference to the accompanying drawing in which a system embodying my invention is illustrated diagrammatically.

In the drawing, 10 represents the main of an alternating current distribution system. Connected across the mains 10 is a synchronous motor 11 having a field 12, which is excited by a direct current generator 13. The generator 13 has a shunt field winding 26 and a variable resistance 25 in series therewith. At the right of the figure is shown a regulator, such as that disclosed in the above-mentioned Tirrill patent. This regulator consists of a floating contact 17, which is actuated by an electromagnet consisting of a coil 18 which is connected across the distributing mains 10. The coil 18 acts upon a core 20 which is connected to the lever carrying the contact 17. The vibrating contact 21 is actuated by an electromagnet consisting of a coil 22 which is connected across the armature leads of the generator 13. In series with this coil, I insert a source of electrical energy. In the system shown, this source of electrical energy consists of a constant potential generator 15 having a shunt field winding 27 and a variable resistance 28 in series therewith. The vibrating contact 21 serves to cut in and out the resistance 25 in series with the field 26 of the generator 13.

It will be apparent from the foregoing that the field 12 of the synchronous motor 11 will only receive the voltage of the generator 13, whereas the coil 22 will receive the sum of the voltages of the generators 13 and 15. The voltage of the generator 13 will be controlled by means of the vibrating regulator. Let us assume that the generator 15 is initially adjusted by means of the resistance 28 to generate a constant voltage of 125 volts, and that the generator 13 is arranged to generate a maximum voltage of 125 volts; therefore, when the voltage of the generator 13 is the maximum, that is, 125 volts, the voltage applied to the field winding 12 will be 125 volts, and the voltage applied to the coil 22 will be 250 volts. When, however, the voltage of the generator 13 has been reduced to zero, the voltage applied to the field winding 12 will be zero but the voltage applied to the coil 22 will be 125 volts. It is apparent, therefore, that the excitation of the synchronous motor can be reduced to zero without reducing the energy supplied to the coil 22 in a way detrimental to the action of the regulator.

Various modifications of the above described structure will suggest themselves to those skilled in the art, and are to be considered as coming within the spirit and scope of my invention as set forth in the annexed claims.

What I claim as new and desire to secure by Letters Patent of the United States, is:—

1. A means for regulating the electrical condition of a circuit comprising a dynamo-electric machine connected thereto and having an exciting winding, a second dynamo-electric machine connected to supply current to said exciting winding, and a regulator of the vibrating contact type for regulating the field of the latter dynamo-electric machine, said regulator having an electromagnetic coil connected across the armature leads of the second dynamo-electric machine and a source of electrical energy in parallel with said exciting winding and in series with said coil.

2. A means for regulating the field excitation of a dynamo-electric machine comprising a second dynamo-electric machine, and a regulator of the vibrating contact type for the field of the latter dynamo-electric machine, said regulator having an electromagnetic coil connected across the armature leads of said second machine and a source of electrical energy in parallel with the exciting winding of the first-mentioned machine and in series with said coil.

3. A means for regulating the electrical condition of a circuit comprising a dynamo-electric machine connected thereto and having an exciting winding, a second dynamo-electric machine connected to supply current to said exciting winding, and a regulator of the vibrating contact type for regulating the field of the latter dynamo-electric machine, said regulator having an electromagnetic coil connected across the armature leads of the second dynamo-electric machine and a source of electrical energy having a constant potential in parallel with said exciting winding and in series with said coil.

4. A means for regulating the field excitation of a dynamo-electric machine comprising a second dynamo-electric machine, and a regulator of the vibrating contact type for the field of the latter dynamo-electric machine, said regulator having an electromagnetic coil connected across the armature leads of said second machine and a source of electrical energy having a constant potential in parallel with the exciting winding of the first-mentioned machine and in series with said coil.

In witness whereof I have hereunto set my hand this 26th day of May, 1919.

ROBERT M. CAROTHERS.